US008800962B2

(12) United States Patent
Ritter et al.

(10) Patent No.: US 8,800,962 B2
(45) Date of Patent: Aug. 12, 2014

(54) VALVE ASSEMBLY HAVING IMPROVED CONNECTIONS

(71) Applicant: Kohler Co., Kohler, WI (US)

(72) Inventors: David H. Ritter, Kohler, WI (US); Chad J. Cochart, Sheboygan, WI (US); Douglas J. Brouwer, Sheboygan, WI (US); Christopher M. Shay, Fredonia, WI (US); Brian S. Core, Fond du Lac, WI (US); Michael W. Smith, Plymouth, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 13/660,921

(22) Filed: Oct. 25, 2012

(65) Prior Publication Data

US 2013/0043419 A1 Feb. 21, 2013

Related U.S. Application Data

(62) Division of application No. 12/358,696, filed on Jan. 23, 2009, now Pat. No. 8,297,305.

(60) Provisional application No. 61/023,917, filed on Jan. 28, 2008.

(51) Int. Cl.
| | |
|---|---|
| *F16L 29/00* | (2006.01) |
| *F16K 3/08* | (2006.01) |
| *F15B 13/00* | (2006.01) |
| *F16K 21/00* | (2006.01) |
| *B61G 5/08* | (2006.01) |
| *F16L 35/00* | (2006.01) |
| *F16L 37/00* | (2006.01) |
| *F16L 55/00* | (2006.01) |
| *F16L 27/00* | (2006.01) |
| *F16L 39/00* | (2006.01) |

(52) U.S. Cl.
USPC ........ 251/148; 137/625.31; 137/801; 285/26; 285/33; 285/280; 285/124.4

(58) Field of Classification Search
CPC ......... F16L 39/00; F16L 37/144; F16L 37/56; F16L 37/14; F16L 37/148; F16L 41/03; E03C 1/0403; F15B 13/0857; F25B 41/003
USPC ................. 251/208; 137/454.2, 454.5, 454.6, 137/614.2, 625.31, 625.32, 801; 285/80, 285/140.1, 26, 31, 33, 281, 280, 285/124.1–124.5, 319, 321
See application file for complete search history.

(56) References Cited

U.S. PATENT DOCUMENTS

| | | | |
|---|---|---|---|
| 2,534,577 A | 12/1950 | Courtot | |
| 2,621,886 A | 12/1952 | Mueller | |

(Continued)

FOREIGN PATENT DOCUMENTS

| | | |
|---|---|---|
| DE | 2926793 A1 | 1/1981 |
| EP | 0 204 869 A1 | 12/1986 |

(Continued)

OTHER PUBLICATIONS

Non-Final Office Action on U.S. Appl. No. 13/660,913, mail date Jun. 11, 2013, 11 pages.

(Continued)

*Primary Examiner* — John K Fristoe, Jr.
*Assistant Examiner* — Hailey K Do
(74) *Attorney, Agent, or Firm* — Foley & Lardner LLP

(57) ABSTRACT

A valve assembly is provided. The valve assembly includes a valve housing and a harbor provided at a lower portion of the valve housing. The valve housing has an internal bore for receiving a valve control cartridge, and the harbor has a first recess suitable for receiving a water supply tube, and a second recess suitable for receiving a second water tube, wherein the harbor also has a slot. The valve assembly further includes the water supply tube mounted in the first recess, the second water tube mounted in the second recess, and a retainer clip positioned in the slot with that clip simultaneously engaging both tubes. The retainer clip comprises a first leg and a second leg connected by a waist to define there between a retaining area, and at least the first leg has formed thereon a notch adjacent a heel of the leg.

16 Claims, 11 Drawing Sheets

(56) References Cited

U.S. PATENT DOCUMENTS

| | | |
|---|---|---|
| 3,385,321 A | 5/1968 | Ehrens et al. |
| 3,677,282 A | 7/1972 | Page |
| 3,780,758 A | 12/1973 | DeVries |
| 3,810,602 A | 5/1974 | Parkinson |
| 3,965,936 A | 6/1976 | Lyon |
| 4,130,136 A | 12/1978 | Garnier et al. |
| 4,205,822 A | 6/1980 | Bernat |
| 4,244,608 A * | 1/1981 | Stuemky .................. 285/305 |
| 4,408,745 A | 10/1983 | Swiers et al. |
| 4,501,191 A | 2/1985 | Webber et al. |
| 4,651,770 A | 3/1987 | Denham et al. |
| 4,733,693 A | 3/1988 | Knapp |
| 4,738,277 A | 4/1988 | Thomas |
| 4,793,375 A | 12/1988 | Marty |
| 4,887,793 A | 12/1989 | Hernandez et al. |
| 4,922,950 A | 5/1990 | Taylor |
| 4,953,593 A * | 9/1990 | Edwards et al. ............. 137/606 |
| 5,010,917 A | 4/1991 | Iqbal |
| 5,042,529 A | 8/1991 | Yeh |
| 5,052,278 A | 10/1991 | Smillie et al. |
| 5,104,158 A | 4/1992 | Meyer et al. |
| 5,107,884 A | 4/1992 | Orlandi |
| 5,150,737 A | 9/1992 | Clerc |
| 5,174,324 A | 12/1992 | Chrysler |
| 5,247,963 A | 9/1993 | Hostetler et al. |
| 5,271,646 A | 12/1993 | Allread et al. |
| 5,417,242 A | 5/1995 | Goncze |
| 5,462,087 A * | 10/1995 | Fukano et al. ................ 137/884 |
| 5,749,393 A | 5/1998 | Yang |
| 5,853,023 A | 12/1998 | Orlandi et al. |
| 5,934,321 A | 8/1999 | Miya et al. |
| 5,944,056 A | 8/1999 | Miyazoe et al. |
| 5,996,614 A | 12/1999 | Ashton |
| 6,231,027 B1 | 5/2001 | Baker et al. |
| 6,231,089 B1 | 5/2001 | DeCler et al. |
| 7,032,260 B2 * | 4/2006 | Hwang ............................ 4/695 |
| 7,063,106 B2 | 6/2006 | Knapp |
| 7,073,825 B2 | 7/2006 | Takada et al. |
| 7,658,202 B2 * | 2/2010 | Mueller et al. ........... 137/315.12 |
| 2004/0069358 A1 | 4/2004 | Knapp et al. |
| 2008/0083898 A1 | 4/2008 | Chen et al. |

FOREIGN PATENT DOCUMENTS

| | | |
|---|---|---|
| JP | 55086161 A | 6/1980 |
| JP | 59190579 A | 10/1984 |

OTHER PUBLICATIONS

Restriction Requirement for U.S. Appl. No. 12/358,696, mail date Sep. 23, 2011, 7 pages.
Office Action for U.S. Appl. No. 12/358,696, mail date Oct. 31, 2011, 7 pages.
Office Action for U.S. Appl. No. 12/358,696, mail date Apr. 23, 2012, 10 pages.
Notice of Allowance for U.S. Appl. No. 12/358,696, mail date Jul. 2, 2012, 7 pages.
Partial Search Report for International Application No. PCT/US2009/000546, mail date May 26, 2009, 4 pages.
International Search Report for Application No. PCT/US2009/000546, mail date Jul. 16, 2009, 7 pages.
Written Opinion and International Preliminary Report for European Application No. PCT/US2009/000546, mail date Jun. 9, 2010, 11 pages.
Non-Final Office Action on U.S. Appl. No. 13/660,913 (F&L 046150-1491), mail date Mar. 19, 2014, 16 pages.

* cited by examiner

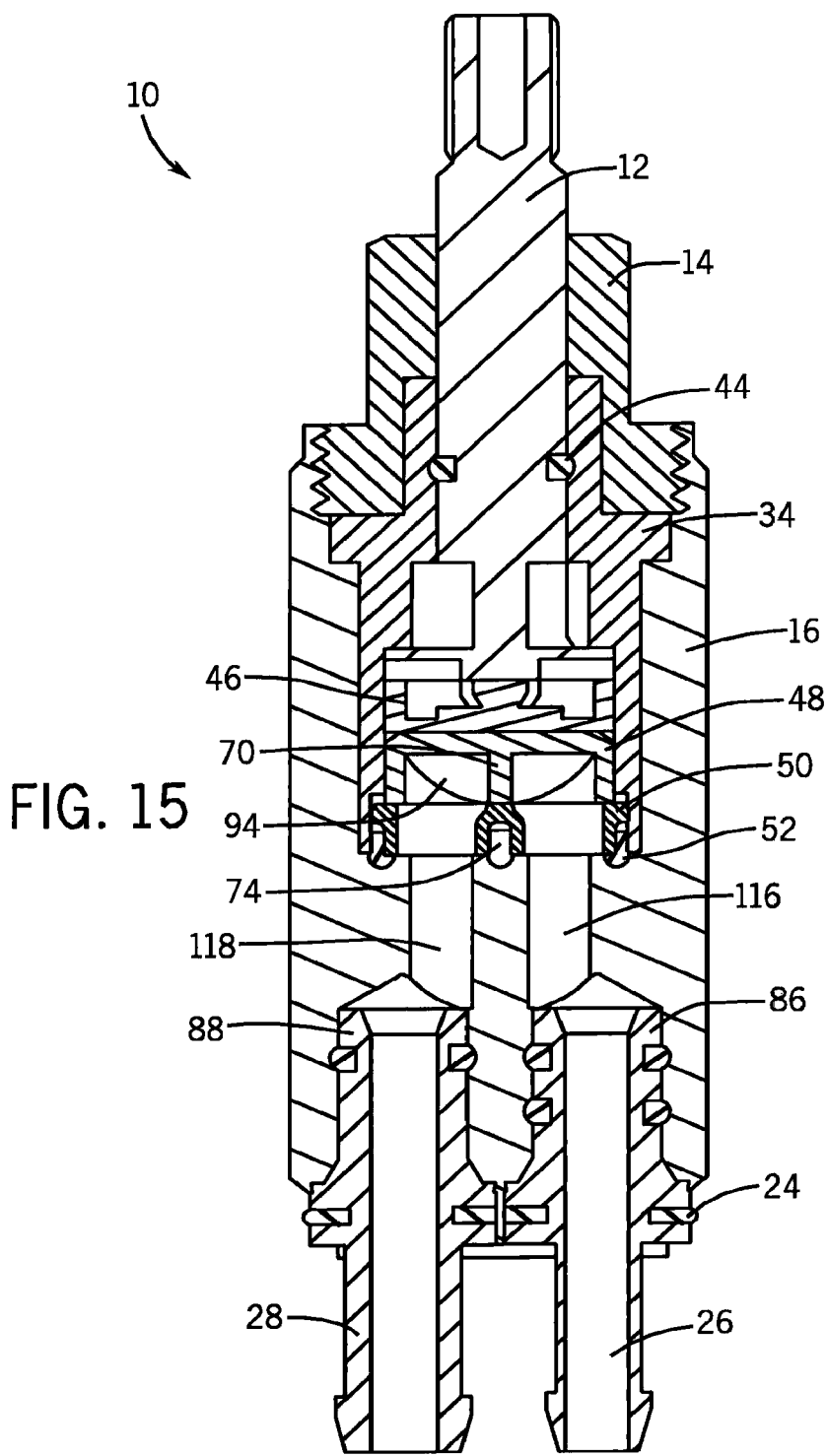

VALVE ASSEMBLY HAVING IMPROVED CONNECTIONS

CROSS-REFERENCE TO RELATED PATENT APPLICATIONS

This application is a Divisional of U.S. application Ser. No. 12/358,696, filed Jan. 23, 2009, which claims priority from U.S. Provisional Application 61/023,917, filed Jan. 28, 2008, both of which are incorporated herein by reference in their entireties.

STATEMENT OF FEDERALLY SPONSORED RESEARCH OR DEVELOPMENT

Not applicable.

BACKGROUND

The present invention relates to valve assemblies having improved disk, bonnet, and hose attachment features.

A variety of fluid control valves are known. One type of fluid control valve is a rotational, non-rise valve. This type of valve is commonly used to control a flow of a single particular fluid, such as a hot or cold water supply, to a faucet, spout, or other plumbing fitting. Some such valves have a handle that drives a rotatable valve stem, with the stem in turn rotating an apertured disk over an apertured stationary disk, to control the flow of a fluid up from the bottom of a valve cartridge and out the side. This type of valve is commonly used in a "widespread" arrangement where one such valve is positioned about six inches to the right of a spout, another such valve is positioned about six inches to the left of a spout, and the linkages between the valves and the spout are below a countertop or the like.

While such valves have many desirable features, there is still room for improvement. For example, the flow path of some such valves brings the water into substantial contact with a brass housing. Because many conventional brasses contain some lead, and because long term use of such valves has therefore raised some regulatory concerns about contact of potable water with leaded brass, it is desirable to find ways of configuring such valves to minimize contact between the potable water and leaded brass housings.

In some approaches to address this problem suppliers have attempted to remove lead from their housing brasses (e.g. by substituting bismuth for the lead). However, this can add cost and/or make machinability more complex when forming the housing.

Another approach is to link plastic or copper tubing to the valve, and place the tubing inside an outer housing, to minimize the time that the potable water is in contact with the leaded brass. However, this may still leave considerable contact between the valve housing and the potable water, particularly in widespread configurations.

There have been some attempts to redirect flow downward rather than sideways in connection with mixing valves. For example, in the valve disclosed in U.S. Pat. No. 5,417,242 a movable disk redirects mixed water downward, rather than sideways. This is not in connection with a single flow control valve, and in any event still requires substantial contact between the valve housing and potable water.

Further, conventional single control valve configurations often rely on multiple O-ring seals or other techniques to avoid leakage out of the valve. See e.g. U.S. Pat. No. 4,651,770. Given that such valves can be expected to be used for decades once installed, there is an interest in reducing the number of such O-rings needed, and the incidence of needed maintenance relating thereto.

Moreover, there is a continued interest in reducing the complexity of assembling such valves, to lower cost relating thereto. A particular area of interest is how to reduce the labor costs relating to assembling the water supply and/or outlet connections to the valve cartridge, without compromising reliability of the connection.

Another area of such valves where there is a desire for improvement relates to optimizing the level of rotational resistance to control handle movement while supporting the rotational stem against wobble. Without some amount of resistance when turning a valve, it may appear to a consumer that the valve is broken or improperly functioning. Too much resistance can make the valve undesirable insofar as use by persons who have arthritis or otherwise are unable comfortably supply the needed force. Further, whatever solution is developed must impede excess amounts of wobble when the handle forces reach the rotational stem.

In some prior art configurations, tightening an outer bonnet too much or too little can impact on the appreciated resistance. Even where the resistance is determined in other ways, manufacturing variability can lead to undesirable variations in perceived resistance.

Hence, a need exists for improvements in these areas with respect to valve assemblies.

SUMMARY

In one aspect the present invention provides a valve assembly suitable to control the flow of a first fluid supply (e.g. hot or cold water), but not more than one fluid supply. Hence, this embodiment relates to single control valves, rather than mixing valves.

There is a valve housing having an internal bore, wherein both an inlet port and an outlet port extend between the internal bore and an exterior of the valve housing. A valve cartridge is positioned in the internal bore to control the volume of fluid flow from the inlet port to the outlet port.

The valve cartridge has a stationary disk positioned over both the inlet port and the outlet port, wherein the stationary disk has an inlet aperture and an outlet aperture. There is a movable disk positioned over the stationary disk and having a cavity on its bottom side. Also, a rotatable valve stem is operationally linked to the movable disk such that rotation of the valve stem can cause rotation of the movable disk over the stationary disk, with the movable disk as a result moving between a first position that prevents fluid flow between the inlet port and the outlet port, and a second position where fluid flow from the inlet port is permitted to pass up through the inlet aperture, through a portion of the cavity, down through the outlet aperture and into the outlet port.

Hence, there is provided a single control non-rise valve that reverses the flow of water downward rather than sideways out in contact with the valve housing. This permits the outflow flow to occur with reduced contact with a leaded brass housing or the like.

In preferred forms both the stationary disk and the movable disk are ceramic disks, the cavity has a partition wall, and an upper portion of the cavity is concavely contoured along a side of the partition wall to facilitate fluid flow between the inlet aperture and the outlet aperture when the partition wall is rotationally positioned so as not to prevent such flow. Also, both the inlet aperture and the outlet aperture can be essentially D-shaped in top view, in a back-to-back alignment, while a variety of other shapes can also be selected.

In some embodiments one can have the valve cartridge be at least in part retained in the valve housing by a bonnet nut threaded to an internal wall of the valve housing, where an internal channel of the bonnet nut is provided with means for controlling a level of resistance to rotation of stem.

Also, in varied embodiments there can be a harbor at a lower end of the valve housing that has a first recess for receiving a water supply tube, and a second recess for receiving a water outlet tube. The harbor also has a slot for receiving a retainer clip, and the assembly also includes a retainer clip positioned in the slot with that clip engaging both tubes to retain both.

In another aspect the invention provides a valve assembly. It includes a valve housing having an internal bore for receiving a valve control cartridge, and a harbor provided at a lower portion of the valve housing that has a first recess suitable for receiving a water supply tube, and a second recess suitable for receiving a second water tube, wherein the harbor also has a slot.

There is also a water supply tube mounted in the first recess, a second water tube mounted in the second recess, and a retainer clip positioned in the slot with that clip simultaneously engaging both tubes. For example, both tubes may have an annular groove suitable for receiving the retaining clip, and an O-ring seal positioned in one of the recesses.

In an especially preferred form the retaining clip is a substantially flat u-shaped clip. For example, there can be a U-shaped clip having a first leg and a second leg connected by a waist to define there between a retaining area. Both the first leg and the second leg can have formed thereon a notch adjacent a heel of the leg (which catches onto the tubes). In this aspect of the invention there is provided an easy way to simultaneously attach multiple water tubes (e.g. an inlet line and an outlet line), regardless of whether the valve is a single control valve or a mixing valve.

In yet another aspect of the invention there is provided a valve housing having an internal, generally cup-shaped bore. A valve control cartridge is inserted into the bore and has a rotatable control stem extending upwardly there from. There is also a bonnet nut threaded to an internal wall of the valve housing, the bonnet nut having a through channel that surrounds the control stem.

Means are provided along the through channel to control a level of resistance to rotation of stem. For example, this means may be selected from the group consisting of flexible fingers, bearing sleeves, lubrication pockets, and coatings, in each case where the stem is positioned to rub against the means as the stem is rotated. Alternatively, the means may be a glass-filled polymer surface of the bonnet nut positioned in contact with the stem to frictionally engage the stem. This aspect of the invention focuses on how a rotatable control stem may be frictionally controlled, regardless of the nature of the other valve components, or how tubing is attached to the valve.

Hence, the present invention, in various embodiments, provides a variety of advantages. First, it can be used to reduce the contact between the potable water and a valve housing possibly made of a leaded material. Next, it reduces labor costs by facilitating attachment of multiple fluid lines to the valve housing simultaneously. Also, it provides excellent support to the rotatable stem to reduce undesired handle wobble while providing careful control of the perceived frictional resistance to stem rotation.

These and still other advantages of the present invention will be apparent from the description below and the accompanying drawings. While preferred embodiments are described and depicted, it should be understood that this disclosure is by way of example. Hence, the claims should be looked to in order to judge the full scope of the invention.

BRIEF DESCRIPTION OF THE DRAWINGS

FIG. 15 is a cross-sectional view of the valve assembly of FIG. 1.

DETAILED DESCRIPTION

Figure 1:
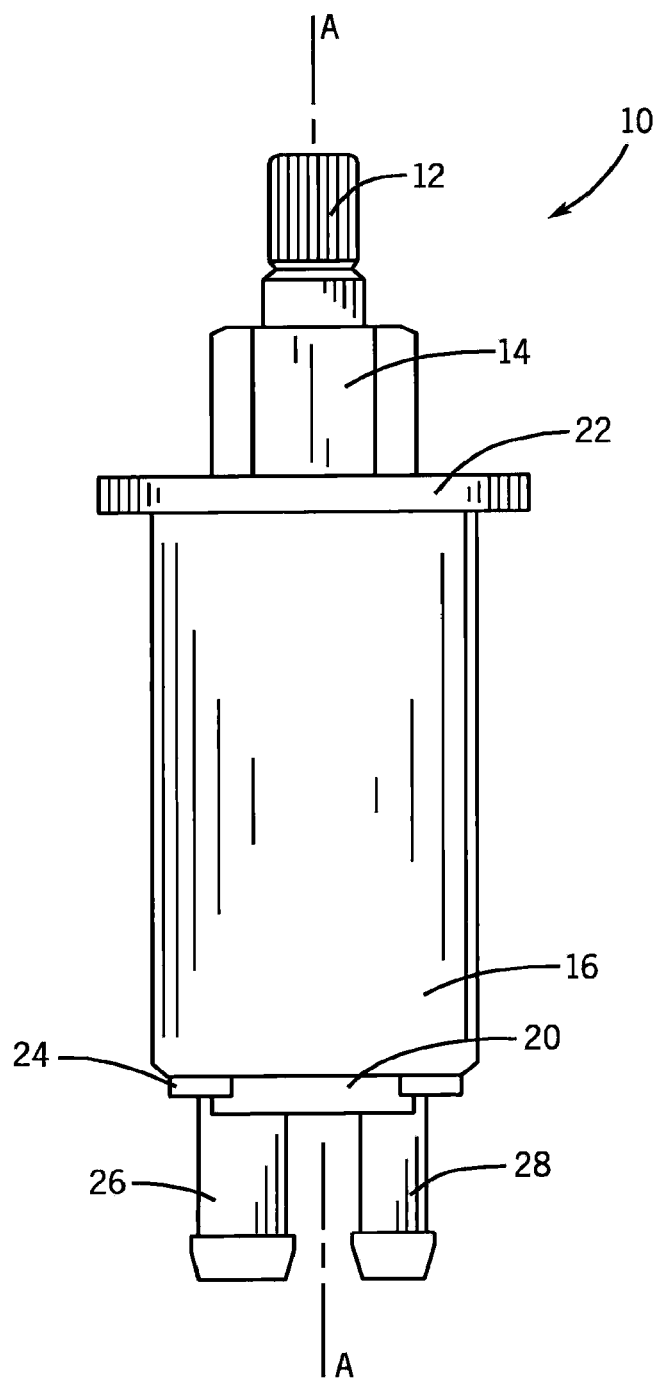
FIG. 1 is a front plan view of a valve assembly of the present invention.

Referring first to FIG. 1, a valve assembly 10 is shown oriented along a longitudinal axis A. A valve stem 12 extends out from a bonnet nut 14 that is threaded into the valve housing 16. The valve housing 16 has a pair of retaining segments 20 defining a harbor slot there between. Also, there may optionally be a flange 22 near the top of the valve housing 16. As will be understood from FIG. 4, there can be a hose clip 24 inserted into the harbor slot which holds a fluid inlet hose 26 and a fluid outlet hose 28 in recesses of the valve housing 16 by engaging the slot and the hoses 26 and 28.

Figure 2:
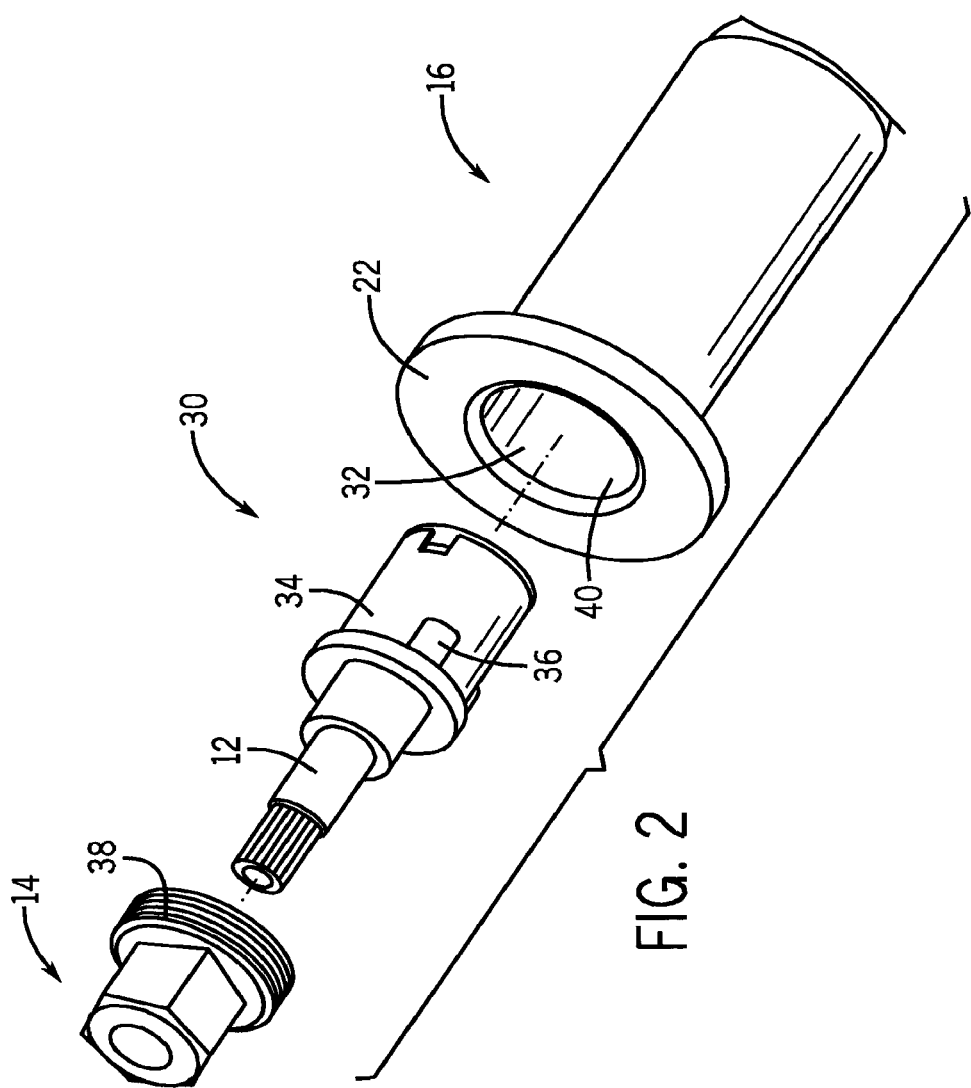
FIG. 2 is an exploded perspective view of an upper portion of that valve assembly.

Referring next to FIG. 2, there is shown a valve cartridge 30 inserted into an internal bore 32 of the valve housing 16 and retained in the valve housing 16 by the bonnet nut 14. The valve cartridge 30 includes valve stem 12 which protrudes out. There can be tabs 36 that rotationally align and fix the valve cartridge housing 34 in relation to appropriate structures in the internal bore 32.

Once the valve cartridge 30 is inserted into the bore 32, the bonnet nut 14 is threaded into corresponding threads along the internal bore to secure the valve cartridge 30 in the bore 32. Note in FIG. 13 exterior threads 38 which engage with the interior threads 40 as shown in FIG. 2. In some embodiments, the bonnet could instead be connected using bayonet mounting.

Figure 3:
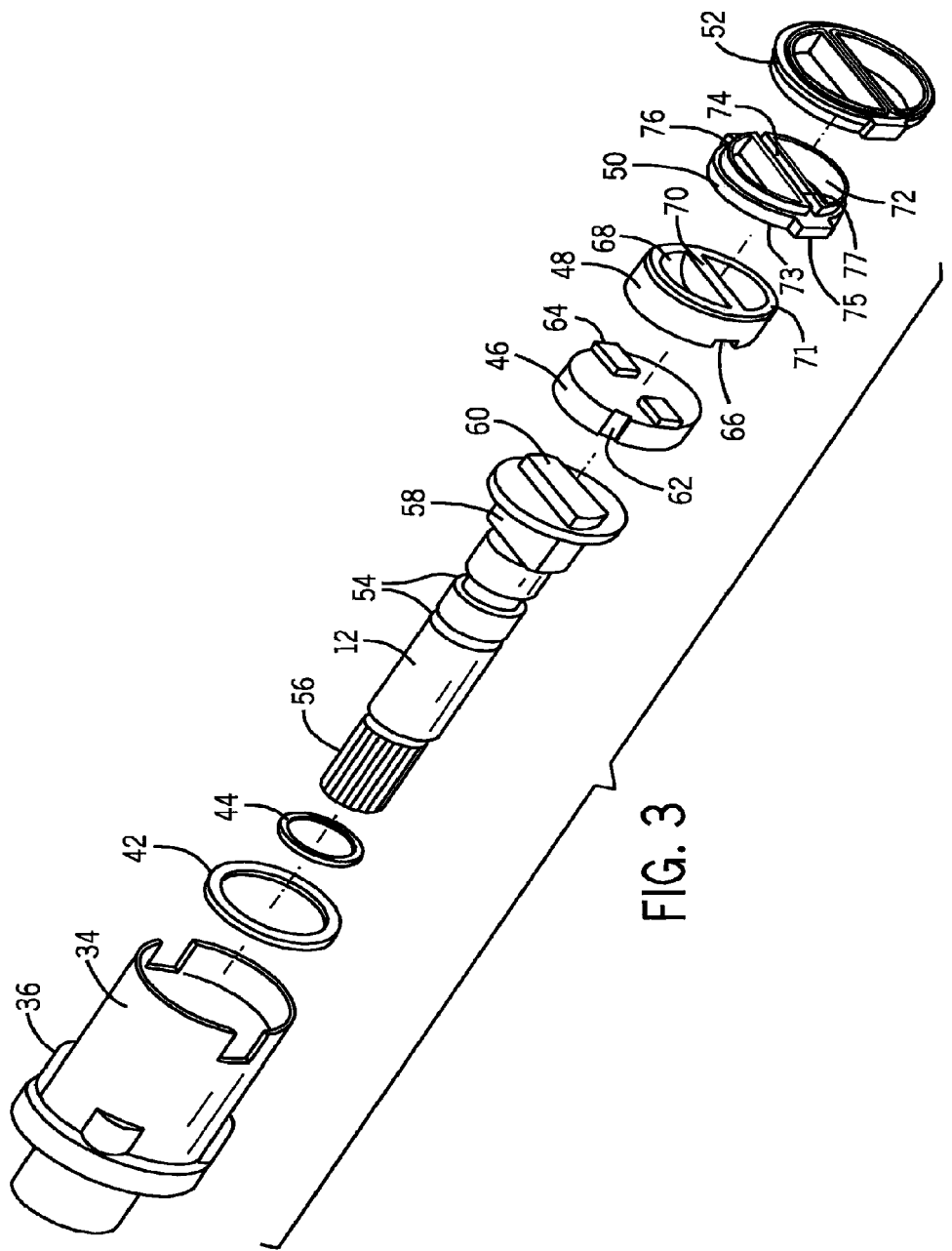
FIG. 3 is an exploded perspective view of certain components of the valve assembly.

Referring now to FIG. 3, the valve cartridge housing 34 retains a number of components including a glide washer 42, an o-ring 44, the valve stem 12, a disk adapter 46, a moveable disk 48, a stationary disk 50, and a lower valve seal 52. The washer 42 and o-ring 44 seal the interface between the top of the valve cartridge housing 34 and the valve stem 12.

The o-ring 44 may be inserted into one of the grooves 54 on the valve stem 12. The valve stem 12 has the usual splined end 56 adapted for attachment to a control handle (not shown). The valve stem 12 also includes a transverse tab 58 which can be used to restrict the range of rotation of the valve stem 12 within the valve cartridge housing 34 by placing appropriate structures along the internal bore.

The valve stem 12 also has a bar-like drive foot 60 which can be inserted into one of a cross-shaped pair of slots on the mating face of the disk adapter 46, depending on whether right hand or left hand rotation is desired. The drive foot 60 rotatably drives the disk adapter 46 as the valve stem 12 is rotated. An axially extending notch 62 at a point along the circumference of the disk adapter 46 may be used to properly align the adaptor and identify such alignment.

The disk adapter 46 also has a pair of axially downwardly extending tabs 64 that can be inserted into tab cutouts 66 on of the moveable disk 48 to permit the adaptor to rotatably drive the moveable disk 48. Importantly, the moveable disk 48 has a pair of recesses 68 separated by a partition wall 70 on its lower face 71. The face 71 of the moveable disk 48 is placed flush in contact with the stationary disk 50.

The stationary disk 50 has a pair of apertures 72 extending from face 73 to a lower face 76. These are defined by a wall 74, such that they appear back-to-back D-shaped. The stationary disk 50 also has a pair of tabs 75 to rotationally fix the stationary disk 50 in the valve cartridge 30 by inserting the tabs 75 into stops in the valve cartridge. A lower valve seal 52 may be inserted into a recessed groove 77 on the lower face 76 of the stationary disk 50.

It should be appreciated that the disk adapter 46 might be eliminated by projecting the stem directly into the movable disk (e.g. if the control stem of the valve assembly 10 consistently needs to be turned in one direction to open the valve).

Figure 4:
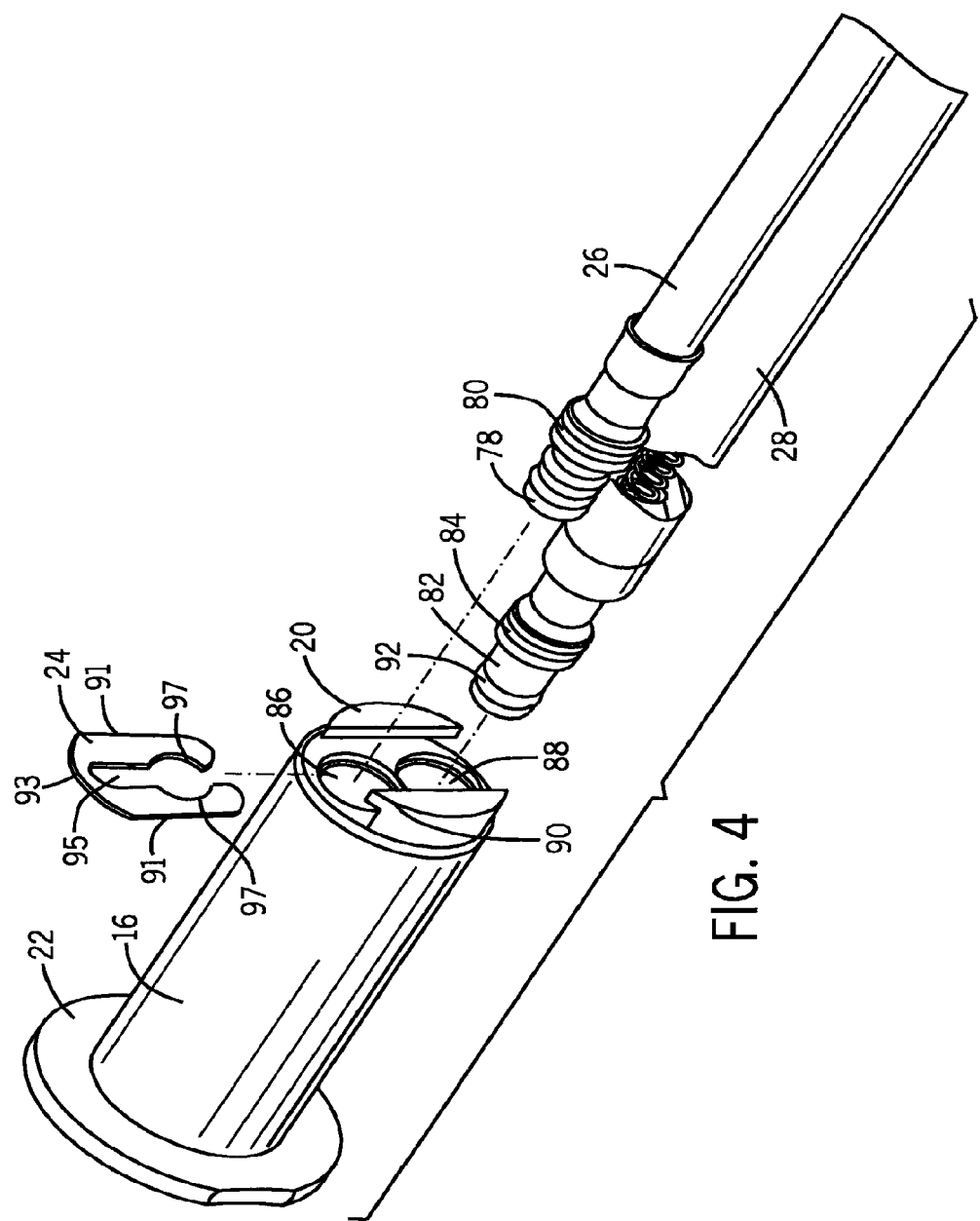
FIG. 4 is an exploded perspective view of a lower portion of that valve assembly.

Referring next to FIG. 4, it can be observed how the fluid inlet hose 26 and the fluid outlet hose 28 are preferably connected to the valve housing 16. The fluid inlet hose 26 has an attachment end 78 having an annular recess 80, and the fluid outlet hose 28 has an attachment end 82 having an annular recess 84. In addition, appropriate grooves can be provided to receive O-rings 92 adjacent these ends.

The attachment ends 78 and 82 are inserted into recesses 86 and 88 of a harbor portion of the valve housing. As will be appreciated from FIG. 15, these recesses are in fluid communication with a fluid inlet port 116 and a fluid outlet port 118 that extend to the internal bore 32.

Hose clip 24 can be inserted into the slot formed by the retaining segments 20 on the valve housing 16 to simultaneously engage the attachment ends 78 and 82 of the hoses 26 and 28 by engaging the recesses 80 and 84.

The clip 24 has two legs 91 connected by a waist 93. These define a receiving area 95 there between. There are also notches 97 near the lower heel of the legs 91. When the tubes are axially aligned one over the other the receiving area 95 helps catch the tubes between legs 91. Notches 97 then help catch the lower tube.

This clipped attachment system is advantageous because it permits two hoses to be held in place with the insertion of a single clip. Moreover, because the clip can easily be slid into place, it is easier to connect hoses than it would be to do so using a threading system.

Of course, other ways of having a single sliding clip catch two tubes simultaneously could be used. For example, a single prong could extend into catch grooves on the inward sides of the tubes, rather than requiring two prongs.

Referring now to FIGS. 5-8, the stationary disk 50 is shown in greater detail. It may be made of a ceramic material which has a lower valve seal 52 made of a different material inserted into the recessed groove 77 to seal the space between the stationary disk 50 and the bore 32.

FIGS. 9-12 show the moveable disk 48 in detail. It may also be made of a ceramic material. In any event, it preferably has a pair of recesses 68 that are separated by a wall 70 on one of the faces 71 of the moveable disk 48. As can be seen from FIG. 12, the pair of recesses 68 have a concave geometry along a curved internal wall surface 94. As shown, the profile of the curved internal wall surface 94 is roughly cylindrical such that the curved internal wall surface 94 approaches the face 71 at points 96 and 98, but the concave surface reaches a maximum distance from the face 71 near a point 100. This contouring helps to minimize undesired forces and turbulence which might otherwise occur when the flow path of the water reverses itself.

Similar to the stationary disk 50, the pair of recesses 68 in the moveable disk 48 may be back-to-back d-shaped shapes in plan view.

At one rotational limit of the valve stem 12 the d-shaped profiles on the moveable disk 48 and the stationary disk 50 can be aligned. This orientation would be a closed position of the disk valve, as the partition walls 70 and 74 are aligned such that the inlet and outlet ports are not in fluid communication with one another.

After a 90 degree turn of the valve stem 12, the wall 70 would be at a right angle relative to the wall 74. This orientation would correspond to an open position of the disk valve, since the inlet and outlet ports would now be in fluid communication with one another.

There are many benefits of providing partitioned ceramic disks.

For one, the symmetry of the disks allows for their use in various valve applications without altering the geometry of the disks. For example, the moveable disk could be configured in one valve such that the clockwise rotation of the moveable disk opens the valve. However, in a different valve, the same moveable disk could be configured such that the counter-clockwise rotation of the moveable disk opens the valve. As described above, the assembly of these two valves might be similar except for the configuration of an adaptor disk. Thus, the use of partitioned disks can eliminate the need for separate production equipment for manufacturing disks for clockwise and counter-clockwise type applications.

Additionally, partitioned disks may reduce the contact area between the moveable disk 48 and the stationary disk 50. The reduced contact area decreases the amount of water deposit build up between the moveable disk 48 and the stationary disk 50 and, thus, reduces operating friction over time.

Further, the use of ceramic disks eliminates the valve drive shaft from exposure to various water chemistries. This eliminates many of the negative effects of water on valve operation by minimizing the number and types of valve components that the water contacts. This minimizes the likelihood of the water being exposed to a lead-containing component in the valve or corroding the valve parts.

Figure 5:
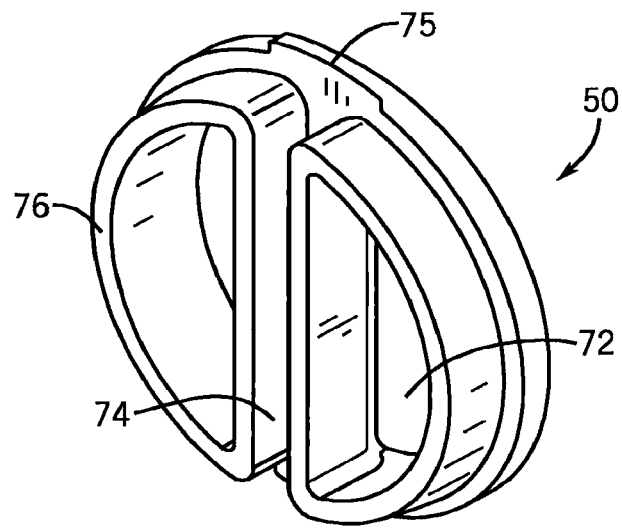
FIG. 5 is a lower perspective view of a stationary disk of the valve assembly.
Figure 5A:
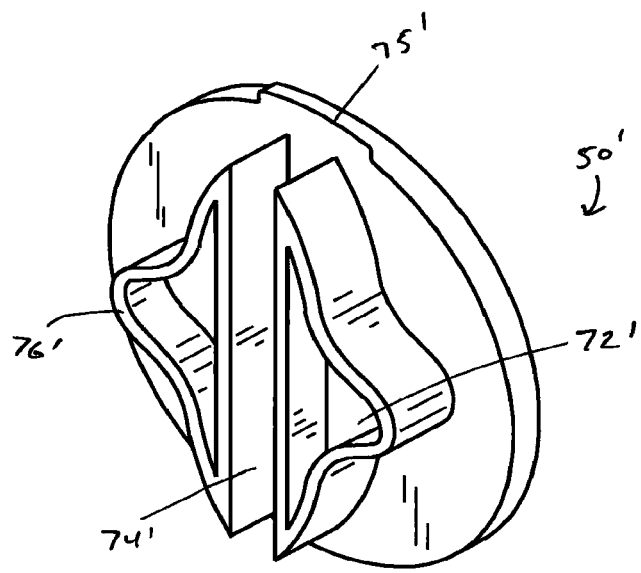
FIG. 5A is a lower perspective view of an alternate form of the stationary disk.
Figure 6:
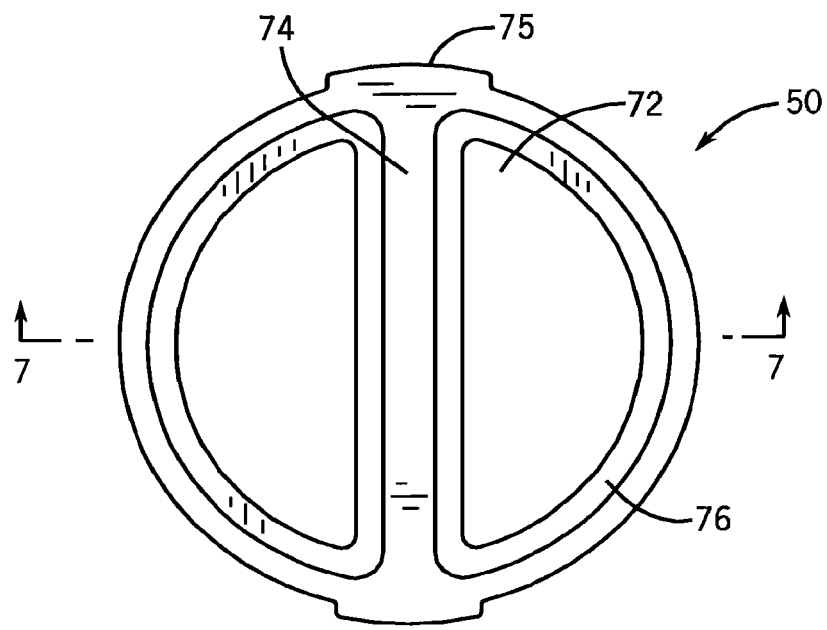
FIG. 6 is a bottom plan view of that stationary disk.
Figure 7:
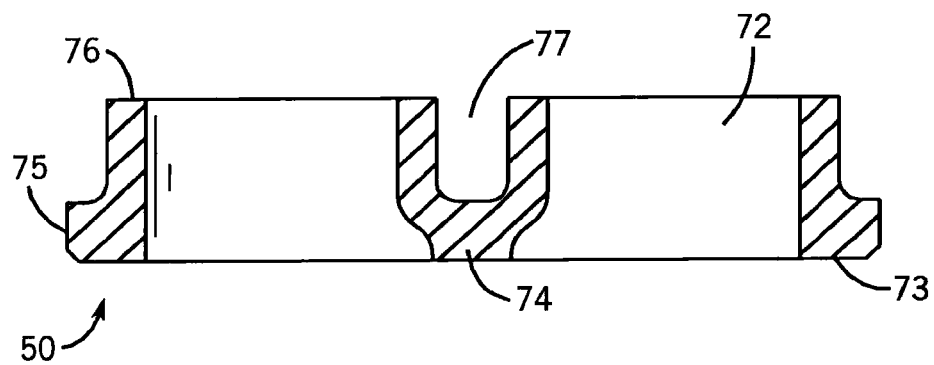
FIG. 7 is a sectional view taken through lines 7-7 of FIG. 6.
Figure 8:
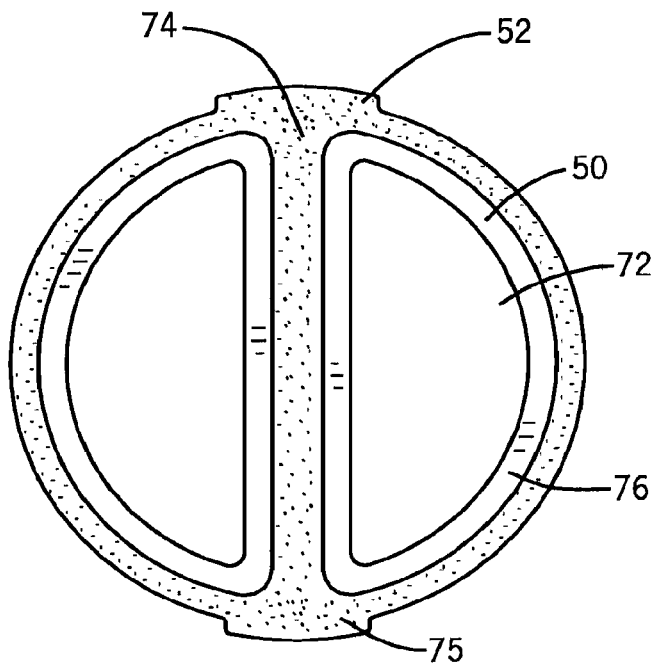
FIG. 8 is a bottom plan view of that stationary disk, with a lower valve seal mounted thereon.
Figure 9:
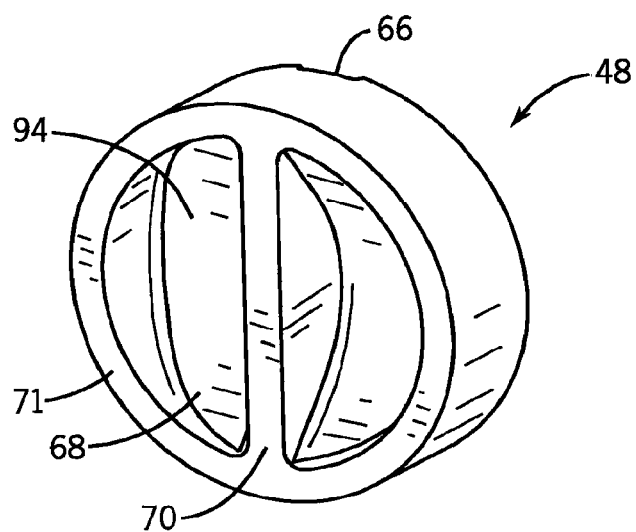
FIG. 9 is a lower perspective view of a moveable disk of the present invention.
Figure 9A:
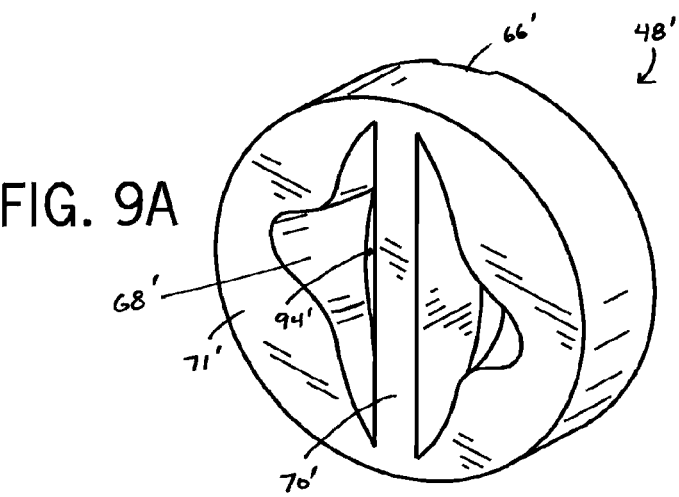
FIG. 9A is a lower perspective view of an alternate form of the moveable disk for use with the stationary disk in FIG. 5A.
Figure 10:
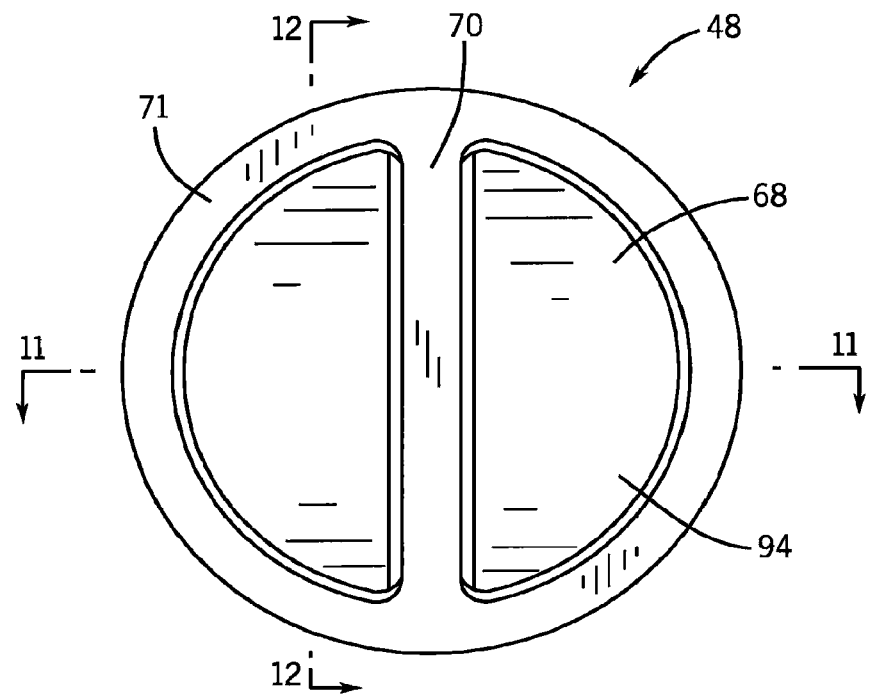
FIG. 10 is a top plan view of the moveable disk.
Figure 11:
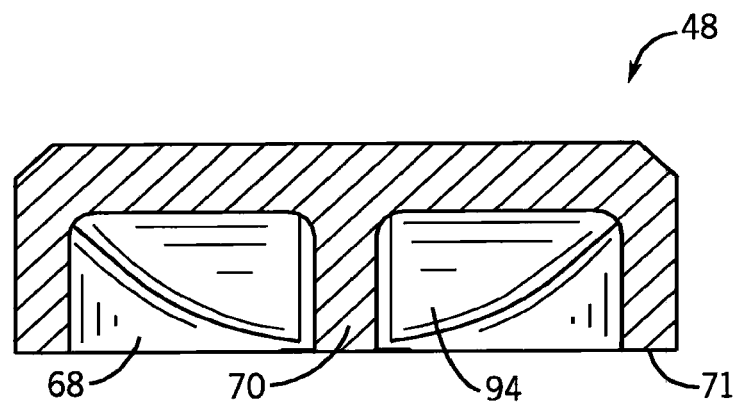
FIG. 11 is a cross-sectional view taken along line 11-11 of FIG. 10.
Figure 12:
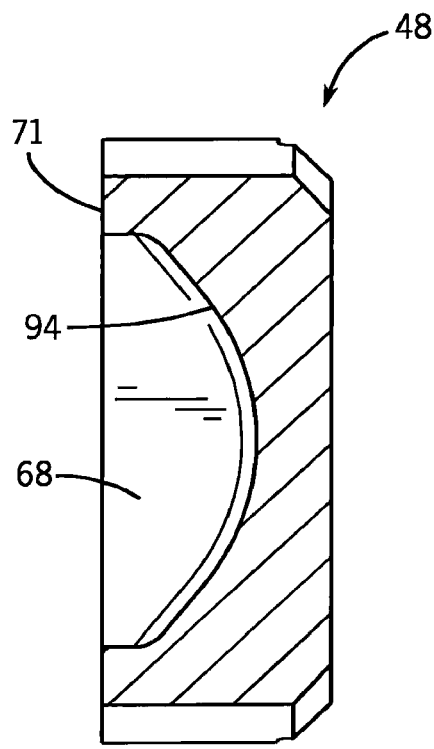
FIG. 12 is a cross-sectional view taken along line 12-12 of FIG. 10.

It should be appreciated that in some forms, the particular geometry of the recesses 68 in the moveable disk 48 and the apertures 72 in the stationary disk 50 may be differently shaped. Referring now to FIGS. 5A and 9A, an alternative form of the stationary disk 48' and 50' are shown, with like features having like numbers as FIGS. 5 and 9, but with the addition of primes. Notably, the shape of the partitioned apertures 72' and recesses 68' have been altered along the contacting faces of the disks 48' and 50'. In particular, the curved walls of the D-shape have been moved closer to the partition wall at each end, while the center portion of the curved wall extends away from the partition wall.

Changes to the geometry of the partitioned recesses and apertures allow for flexibility of the relationship between flow rate and angle of rotation. By tweaking the shape of the recesses and apertures, the flow rate-angle relationship can be finely adjusted. In comparison to the double-D shaped partition in FIGS. 5 and 9, these disks 48' and 50' would reduce the initial flow rate upon rotation, giving more fine control over flow over the first ten to twenty degrees of movement.

Figure 13:
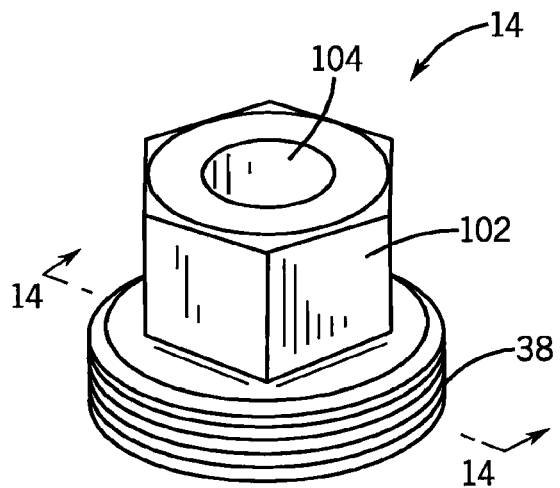
FIG. 13 is an enlarged perspective view of a bonnet nut of the valve assembly.
Figure 14:
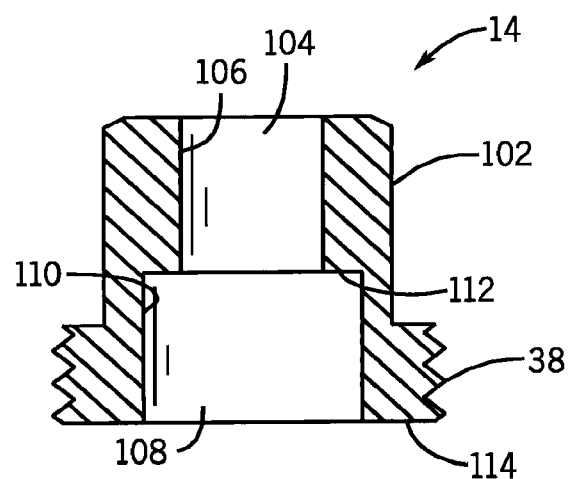
FIG. 14 is a cross-sectional view taken along line 14-14 of FIG. 13.

Referring now to FIGS. 13 and 14, a bonnet nut 14 can have an outer hex fastening surface 102, a bore 104 having an inner surface 106 and a counterbore 108 having an inner surface 110. When referring to the surface of the bore with respect to the bonnet nut 14, the surface being referred to can include any portion, or all of, surfaces 106 and 110, as well as the perpendicular surfaces 112 and 114.

The bonnet nut 14 secures the valve cartridge 30 into the bore 32 in the valve housing 16. The bore 104 permits the valve stem 12 to extend out of the bonnet nut 14 such that the valve stem 12 may be turned and the counterbore 108 may permit the valve cartridge 30 to be held in the bore 32.

The bonnet nut 14 can have its internal bores designed to provide specific resistance to stem rotation when the stem rubs against it. For example, easy rotation can be achieved by coating the bonnet with a slip coating.

Alternative modifications may be made to the inner surfaces 106 and 110 of the bonnet nut 14. For example, flexible fingers may be added to some or all of the inner surfaces 106, 110, 112, and 114 to rub the valve stem 12 as it is rotated. Such fingers may be polymeric or elastomeric in nature. Likewise, the bonnet nut 14 may be composed of a particular material having an optimal frictional surface, such as, for example, a glass-filled polymer, such that frictional forces between the bonnet nut 14 and at least a portion of the valve stem 12 provides tactile resistance to the applied torque.

Other modifications may be provided to create a specific rotational feel. For example, it is contemplated that the shape of the bore 104 and counterbore 108 could be designed such that a pocket of lubricant could be placed between the bonnet nut 14 and the valve stem 12. The lubricant used in the pocket could be selected to have an appropriate viscosity and resistance to the forces applied during rotation that an appropriate amount of resistance is provided.

Likewise, a set of bearings could be inserted between the bonnet nut 14 and the valve stem 12. The set of bearings could be selected such that resistance is provided as the valve stem 12 is turned.

Many prior art valve assemblies have their valve cartridges held in place by clips or caps threaded on the exterior of the valve housing. In contrast, this valve assembly preferably places the interior of the valve housing 16. This opens up the possibility of recessing the nut partially or totally within the valve housing.

In FIG. 15 the valve is shown in the closed position. Recesses 86 and 88 extend up to ports 116 and 118. A lower valve seal 52 provides a water-tight seal between the surface of the bore 32 and the stationary disk 50.

While various embodiments have been described, it will be apparent to those skilled in the art that other changes can be made as well. Therefore, the present invention is not to be limited to just the described most preferred embodiment. Hence, to ascertain the full scope of the invention, the claims which follow should also be referenced.

INDUSTRIAL APPLICABILITY

The present invention provides an improved fluid control valve, particularly with respect to reducing contact between potable water and a leaded metal housing, simplifying connection of supply and outlet hoses, and supporting and optimizing stem movement.

What is claimed is:

1. A valve assembly, comprising:
   a valve housing having an internal bore for receiving a valve control cartridge;
   a harbor coupled to the valve housing, the harbor comprising:
   a first opening;
   a second opening; and
   a first retaining segment at least partially defining a slot;
   a first water tube having an end portion, the end portion of the first water tube mounted in the first opening;
   a second water tube having an end portion, the end portion of the second water tube mounted in the second opening; and
   a clip comprising a first leg and a second leg, the first leg and the second leg at least partially defining a retaining area therebetween;
   wherein a diameter of the end portion of the first water tube is less than the width of the retaining area, and a diameter of the end portion of the second water tube is greater that the width of the retaining area;
   so that when the clip is positioned in the slot, the clip engages both the end portion of the first water tube and the end portion of the second water tube.

2. The valve assembly of claim 1, wherein the valve housing further comprises:
   a first port fluidly coupling the first opening and the bore; and
   a second port fluidly coupling the second opening and the bore.

3. The valve assembly of claim 1, wherein the harbor further comprises a second retaining segment, the first and second retaining segments cooperatively defining the slot.

4. The valve assembly of claim 1, further comprising an o-ring seated in an annular groove in the end portion of the first water tube, the o-ring sealing between the first water tube and the first opening.

5. The valve assembly of claim 1, wherein at least the first leg has formed thereon a notch adjacent a heel.

6. The valve assembly of claim 1, wherein the end portions of the first and second water tubes comprise an annular groove configured to receive the clip; and
   so that when the clip is positioned in the slot, the clip engages both the annular grooves of the first and second water tubes.

7. The valve assembly of claim 6, wherein the clip comprises a waist coupling the first leg and the second leg; and
   wherein a width of the retaining area at the notch of at least the first leg is greater than a width of the retaining area adjacent the waist.

8. The valve assembly of claim 7, wherein a diameter of the annular recess of the first tube is less than the width of the retaining area adjacent the waist, and a diameter of the annular recess of the second tube is greater that the width of the retaining area adjacent the waist; and
   so that when the clip is positioned in the slot, the first water tube is proximate the waist and the second water tube is distal the waist.

9. A valve assembly, comprising:
   a valve housing having an internal bore for receiving a valve control cartridge;

a harbor provided within an end of the valve housing, the harbor comprising:
    a first opening;
    a second opening; and
    a first retaining segment at least partially defining a slot;
a water supply hose having an end portion, the end portion of the water supply hose having a groove thereon and mounted in the first opening;
a water outlet hose having an end portion, the end portion of the water outlet hose having a groove thereon and mounted in the second opening; and
a clip comprising a first prong and a second prong, the first prong having a first portion and a second portion, and the first prong and the second prong at least partially defining a retaining area therebetween;
wherein a diameter of the end portion of the water supply hose is less than the width of the retaining area, and a diameter of the end portion of the water outlet hose is greater that the width of the retaining area;
wherein when the clip is positioned in the slot, the first prong engages the first retaining segment, the first portion of the first prong engages the groove of the water supply hose, and the second portion of the first prong engages the groove of the water outlet hose.

10. The valve assembly of claim 9, wherein the groove of the water supply hose is adjacent the groove of the water outlet hose, and wherein the first prong extends between the water supply hose and the water outlet hose.

11. The valve assembly of claim 9, wherein the harbor further comprises a second retaining segment, the first and second retaining segments cooperatively defining the slot.

12. The valve assembly of claim 9, wherein when the clip is positioned in the slot, the first water hose is proximate the waist and the second is distal the waist.

13. The valve assembly of claim 9, wherein the groove of the water supply hose extends along a first side of the water supply hose, and wherein the groove of the water outlet hose extends along a first side of the water outlet hose; wherein the first prong extends along the first sides of the water supply hose and the water outlet hose.

14. The valve assembly of claim 13, wherein the first sides of the water supply hose and the water outlet hose are along a same side relative to the valve housing.

15. The valve assembly of claim 13, wherein:
    the end portion of the water supply hose comprises a second groove radially opposite the first groove;
    the end portion of the water outlet hose comprises a second groove radially opposite the first groove;
    the clip comprises a second prong spaced apart from the first prong, the second prong having a first portion and a second portion; and
    when the clip is positioned in the slot, a first portion of the second prong engages the second groove of the first hose, and the second portion of the second prong engages the second groove of the water outlet hose.

16. The valve assembly of claim 15, wherein the first groove of the water supply hose and the second groove of the water supply hose cooperate to form an annular recess.

* * * * *